United States Patent
Yadhav et al.

(10) Patent No.: US 10,299,171 B2
(45) Date of Patent: May 21, 2019

(54) FIRST SERVICE NETWORK NODE, A SECOND SERVICE NETWORK NODE AND METHODS RELATING TO HANDLING OF A SERVICE SESSION

(71) Applicant: Telefonaktiebolaget LM Ericsson (publ), Stockholm (SE)

(72) Inventors: Vinay Yadhav, Upplands Väsby (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 15/030,774

(22) PCT Filed: Aug. 4, 2014

(86) PCT No.: PCT/SE2014/050913
§ 371 (c)(1),
(2) Date: Apr. 20, 2016

(87) PCT Pub. No.: WO2015/084230
PCT Pub. Date: Jun. 11, 2015

(65) Prior Publication Data
US 2016/0255543 A1 Sep. 1, 2016

Related U.S. Application Data

(60) Provisional application No. 61/910,996, filed on Dec. 3, 2013.

(51) Int. Cl.
*H04W 36/00* (2009.01)
*H04W 36/08* (2009.01)
*H04L 29/06* (2006.01)
*H04L 29/08* (2006.01)

(52) U.S. Cl.
CPC ..... *H04W 36/0016* (2013.01); *H04L 65/1003* (2013.01); *H04L 67/148* (2013.01); *H04W 36/0033* (2013.01); *H04W 36/08* (2013.01)

(58) Field of Classification Search
None
See application file for complete search history.

(56) References Cited

U.S. PATENT DOCUMENTS

2003/0212764 A1 11/2003 Trossen et al.
2007/0091846 A1 4/2007 Kim et al.
(Continued)

FOREIGN PATENT DOCUMENTS

CN 101036174 A 9/2007
CN 101536578 A 9/2009
(Continued)

OTHER PUBLICATIONS

Author Unknown, 802.21-2008: IEEE Standard for Local and metropolitan area networks, Part 21: Media Independent Handover Services, IEEE Computer Society, Jan. 21, 2009, The Institute of Electrical and Electronics Engineers, Inc., 323 pages.
(Continued)

*Primary Examiner* — Chi H Pham
*Assistant Examiner* — Raul Rivas
(74) *Attorney, Agent, or Firm* — Withrow & Terranova, PLLC

(57) ABSTRACT

A method in a first service network node for handling a service session associated with user equipment served by a first base station. The first service network node detects a handover signal, indicating a request to prepare for handover of the user equipment from the first base station to a second base station.

26 Claims, 9 Drawing Sheets

(56) References Cited

U.S. PATENT DOCUMENTS

| | | | |
|---|---|---|---|
| 2008/0064402 A1* | 3/2008 | Oh | H04W 36/005 455/436 |
| 2008/0153460 A1 | 6/2008 | Chan et al. | |
| 2010/0048124 A1 | 2/2010 | Lee et al. | |
| 2010/0061336 A1 | 3/2010 | Kim et al. | |
| 2010/0082810 A1 | 4/2010 | Patel et al. | |
| 2010/0135253 A1 | 6/2010 | Lee et al. | |
| 2011/0019614 A1* | 1/2011 | O'Neill | H04L 12/2856 370/328 |
| 2012/0157102 A1* | 6/2012 | Yang | H04W 36/0016 455/436 |
| 2012/0164972 A1 | 6/2012 | Shim et al. | |
| 2013/0290466 A1 | 10/2013 | Lee et al. | |
| 2013/0305246 A1 | 11/2013 | Goggin et al. | |

FOREIGN PATENT DOCUMENTS

| | | |
|---|---|---|
| CN | 102006646 A | 4/2011 |
| EP | 2309819 A1 | 4/2011 |
| EP | 2060138 B1 * | 9/2016 |
| WO | 2011032732 A1 | 3/2011 |
| WO | 2013135443 A1 | 9/2013 |

OTHER PUBLICATIONS

Blake, Steven, et al., "An Architecture for Differentiated Services," Network Working Group, Request for Comments: 2475, Category: Informational, Dec. 1998, The Internet Society, 36 pages.

Davie, Bruce, et al., "An Expedited Forwarding PHB (Per-Hop Behavior)" Network Working Group, Request for Comments: 3246, Obsoletes: 2598, Category: Standards Track, Mar. 2002, The Internet Society, 16 pages.

Felemban, Muhamad, et al., "A Distributed Cloud Architecture for Mobile Multimedia Services," IEEE Network, vol. 27, Issue 5, Sep.-Oct. 2013, IEEE, pp. 20-27.

Heinanen, Juha, et al., "Assured Forwarding PHB Group," Network Working Group, Request for Comments: 2597, Category: Standards Track, Jun. 1999, The Internet Society, 11 pages.

Manzalini, Antonio, et al., "Clouds of Virtual Machines in Edge Networks," IEEE Communications Magazine, vol. 51, Issue 7, Jul. 2013, IEEE, pp. 63-70.

Nichols, Kathleen, et al., "Definition of the Differentiated Services Field (DS Field) in the IPv4 and IPv6 Headers," Network Working Group, Request for Comments: 2474, Obsoletes: 1455, 1349, Category: Standards Track, Dec. 1998, The Internet Society, 20 pages.

Rosenberg, Jonathan, et al., "SIP: Session Initiation Protocol," Network Working Group, Request for Comments: 3261, Obsoletes: 2543, Category: Standards Track, Jun. 2002, The Internet Society, 269 pages.

International Search Report and Written Opinion for International Patent Application No. PCT/SE2014/050913, dated Mar. 3, 2015, 9 pages.

European Search Report for European Patent Application No. 14868395.6, dated Oct. 18, 2016, 4 pages.

* cited by examiner

FIRST SERVICE NETWORK NODE, A SECOND SERVICE NETWORK NODE AND METHODS RELATING TO HANDLING OF A SERVICE SESSION

This application is a 35 U.S.C. § 371 national phase filing of International Application No. PCT/SE2014/050913, filed Aug. 4, 2014, which claims priority to U.S. Provisional Application No. 61/910,996, filed Dec. 3, 2013, the disclosures of which are incorporated herein by reference in their entireties.

TECHNICAL FIELD

Embodiments herein relate to a first network node, a second network node and methods therein. In particular, they relate to handling of a service session in a wireless communications network.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Examples of wireless communication systems are Long Term Evolution (LTE), Universal Mobile Telecommunications System (UMTS) and Global System for Mobile communications (GSM), developed in the 3rd Generation Partnership Project (3GPP).

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

UMTS is a third generation mobile communication system, which evolved from the second generation (2G) Global System for Mobile Communications (GSM). The UMTS terrestrial radio access network (UTRAN) is essentially a RAN using wideband code division multiple access (VVCDMA) and/or High Speed Packet Access (HSPA) for user equipments.

LTE radio access standard has been written in order to support high bitrates and low latency both for uplink and downlink traffic. All data transmission is in LTE is controlled by the radio base station.

Services provided to the user equipment, such as video streaming and gaming, may be placed inside a base station to enhance quality of experience as perceived by the user equipment, and in the end a user, by using local knowledge to optimize the Transmission Control Protocol (TCP) performance. Local knowledge may for example mean local knowledge of popular videos being watched, applications (apps) that are popular and frequently used in a particular area, local knowledge of a large number of users using gaming applications in a local area, etc. Placing services locally in a service network node inside a base station also reduces the network traffic that flows in the backhaul network.

An issue when placing services inside the base station is that of mobility, since a connection between the UE and the service running inside the base station has to be terminated and re-established with another base station while the UE is handed over from a first to a second base station. This results in the UE experiencing a disruption in connection with service.

SUMMARY

It is therefore an object of embodiments herein to provide an improved way of handling a service session provided by a service network node.

According to a first aspect of embodiments herein, the object is achieved by a method in a first service network node for handling a service session associated with a user equipment in a wireless communications network. The user equipment is served by a first base station, and the service session is provided to the user equipment by a service application running in the first service network node which is associated with the first base station.

The first service network node detects a handover signal. The handover signal indicates a request to prepare for handover of the user equipment from the first base station to a second base station.

The first service network node obtains an application state and a network connection state, each associated with the service session and each being specific for the user equipment.

The first service network node detects a handover command, which handover command commands handover of the user equipment from the first base station to the second base station.

The first service network node sends a command to a second service network node, which is associated with the second base station, commanding the second service network node to prepare for migration of the service session from the first service network node.

The first service network node sends the application state and the network connection state to the second service network node, enabling the service session to be resumed in a corresponding service application running in the second service network node.

According to a second aspect of embodiments herein, the object is achieved by a first service network node configured for handling a service session associated with a user equipment in a wireless communications network. The user equipment is configured to be served by a first base station. The first service network node is associated with the first base station and comprises a service application configured to provide the service session to the user equipment.

The first service network node is configured to detect a handover signal. The handover signal indicates a request to prepare for handover of the user equipment from the first base station to a second base station.

The first service network node is configured to obtain an application state and a network connection state, each associated with the service session and each being specific for the user equipment.

The first service network node is configured to detect a handover command. The handover command commands handover of the user equipment from the first base station to the second base station.

The first service network node is configured to send a command to a second service network node, associated with the second base station, commanding the second service network node to prepare for migration of the service session from the first service network node.

The first service network node is further configured to send the application state and the network connection state to the second service network node, enabling the service session to be resumed in a corresponding service application running in the second service network node.

According to a third aspect of embodiments herein, the object is achieved by a method in a second service network node for handling a service session associated with a user equipment in a wireless communications network. The user equipment is served by a first base station and is to be handed over to a second base station which is associated to the second service network node. The service session is provided to the user equipment by a service application running in the first service network node which is associated with the first base station. The second service network node detects a command, from the first service network node. The command commands the second service network node to prepare for migration of the service session from the first service network node.

The second service network node receives an application state and a network connection state from the first service network node. The application state and network connection state is each associated with the service session, and is each specific for the user equipment.

The second service network node provides a corresponding service application running in the second service network node with the application state and the network connection state of the service session, enabling the service session to be resumed in the corresponding service application running in the second service network node.

According to a fourth aspect of embodiments herein, the object is achieved by a second service network node configured for handling a service session associated with a user equipment in a wireless communications network. The user equipment is configured to be served by a first base station and further configured to be handed over to a second base station associated with the second service network node. A first service network node associated with the first base station (111) comprises a service application configured to provide the service session to the user equipment.

The second service network node is configured to detect a command, from the first service network node. The command commands the second service network node to prepare for migration of the service session from the first service network node.

The second service network node is configured to receive an application state and a network connection state from the first service network node. The application state and network connection state is each associated with the service session, and is each specific for the user equipment.

The second service network node is configured to provide a corresponding service application running in the second service network node with the application state and the network connection state of the service session, enabling the service session to be resumed in the corresponding service application running in the second service network node.

The first service network node detects that the first base station wants to do handover of the user equipment before the handover command is sent to the second base station. In that way the first service network node is able to provide the second service network node with the application state and the network connection state at the time the handover command is sent to the second base station and the service session is resumed in the second service network node without any disruption after the handover has been completed.

Since the service session is migrated by sending the application state and the network connection state the migration does not require high bandwidth and/or long time.

An advantage with embodiments herein is that they enable service providers to host services, for example video streaming, closer to the mobile users, for example inside a base station. This reduces the latency between the user equipment and the service which may result in enhanced quality of experience. Placing the services closer to the user equipment also reduces the network traffic load between the base station and an anchor point for mobility, such as a Serving Gateway.

Embodiments herein enable seamless migration of network connection states and service or application states from the service running in a distributed Cloud to another distributed Cloud without any intervention from, or disruption on the user equipment. In embodiments herein the network connection state may also be referred to as the protocol state.

Embodiments herein support any service application. Further, embodiments herein are able to prepare an instance of a service application to handover. The preparation is performed before the user equipment is handed over and reduces the latency between the user equipment and the service.

Embodiments herein further uses handover signals to trigger the migration of Layer-3 and above sessions.

BRIEF DESCRIPTION OF THE DRAWINGS

Examples of embodiments herein are described in more detail with reference to attached drawings in which.

DETAILED DESCRIPTION

Figure 1:
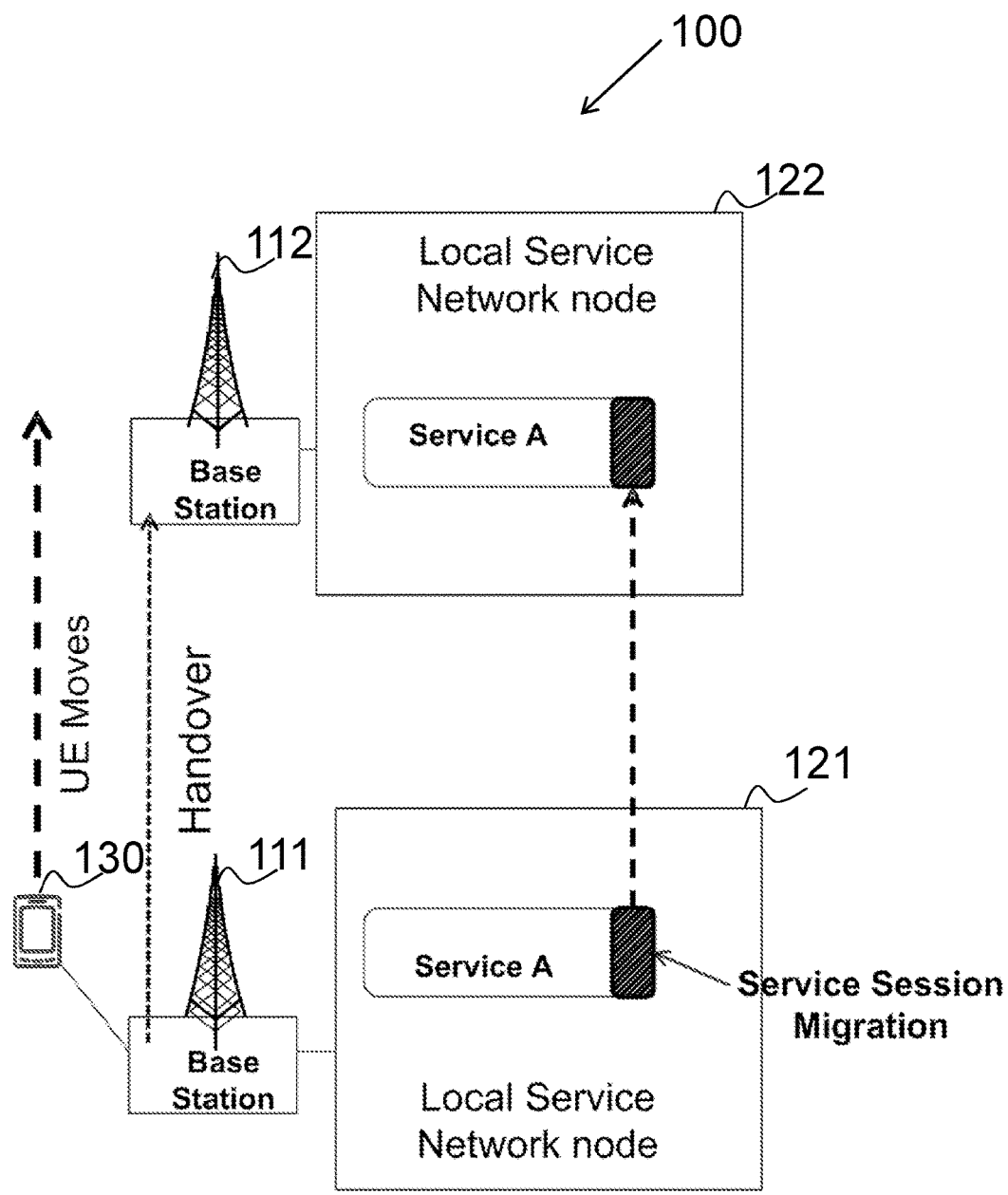
FIG. 1 is a schematic block diagram illustrating embodiments herein.

As part of developing embodiments herein, a problem will first be identified and discussed.

Current technologies deal with migration of service sessions by employing image live migration. Live migration refers to the process of moving a running virtual machine or application between different physical machines without disconnecting a client or the application. Memory, storage, and network connectivity of the virtual machine are transferred from the original host machine to the destination. Image live migration is an Infrastructure as a Service (IaaS) feature that enables migration of an entire image of a machine or a virtual machine, this is not only expensive in terms of the amount of time required to migrate the image but also in term of the high network bandwidth required to migrate the image. This is partly due to the large data volume that must be transferred.

Technologies related to migration of a protocol session, such as a Transmission Control Protocol (TCP) session, have been researched previously for purposes of load sharing in server farms. An objective of these researches were to migrate a live TCP connection from one machine to another in order to share the load of client requests between the servers in a server farm. The purpose of connection migration, i.e. migration of the connection, in the earlier researches was intended for load sharing.

The live migration of an entire image is unsuitable for the mobility of user equipments, where a connection between the UE and the service running inside the base station has to be terminated and re-established with another base station while the UE is handed over from a first to a second base station, since a service running in one machine or virtual machine may be handling sessions related to multiple user equipment. Thus migration of the entire image of the machine or virtual machine could lead to migration of all the sessions handled by that machine, which is undesirable.

The current solution for migrating a service session, where a mobility anchor point maintains the session during the handover does not apply to the approach of serving a user equipment request from a service running locally at a Local Service Network at the base stations.

Thus, currently there are no efficient solutions for migrating service sessions associated with the user equipment from one Local Service Network associated to a source base station to another Local Service Network associated to a target base station, when the user equipment is handed over from one cell to another cell served by the other base station.

Embodiments herein address the issue of mobility of service sessions between services placed into a local cloud in or at base stations.

Cloud computing is a model for enabling ubiquitous, convenient, on-demand network access to a shared pool of configurable computing resources, e.g. networks, servers, storage, applications, and services, that may be rapidly provisioned and released with minimal management effort or service provider interaction.

Embodiments herein enable dynamic re-allocation of a user-session of a service, which re-allocation is needed due to mobility of the user equipment.

Embodiments herein enable a user equipment to have undisrupted connection with the service hosted inside the local service network node at the base station while it moves from one base station to another base station during handover. The approach aims at providing make before break migration of service sessions.

In embodiments herein, methods and service network nodes for enabling migration of service sessions based on mobility triggers, such as handover signals from a base station, are described. Embodiments herein thus enable placing services closer to the user equipment. The service may for example be placed inside a local service network node, such as a cloud, at or inside a base station. Embodiments herein further integrate network connection, e.g. TCP session, migration technology, Layer-3 and above connection handover mechanisms and application state migration.

Embodiments herein reduce latency and decrease the network traffic between the base station and the mobility anchor point.

Embodiments herein are able to prepare an instance of a service application to handover, e.g. by generating an Application Programming Interfaces (API) event, such as a prepare-for-export. The preparation is performed before the user equipment is handed over and reduces the latency between the user equipment and the service.

Embodiments herein may be implemented as a Platform as a Service (PaaS). The capability provided to the consumer by PaaS is to deploy onto the cloud infrastructure consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment.

Embodiments herein may also apply to the multi-point carrier aggregation systems.

Embodiments herein will now be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 depicts a wireless communications network 100 in which embodiments herein may be implemented. The wireless communications network 100 may for example be an LTE/System Architecture Evolution (SAE), UMTS, GSM, any 3GPP cellular network, Wmax, or any cellular network or system.

The wireless communications network 100 comprises a plurality of base stations and other network nodes. More specifically, the wireless communications network 100 comprises a first base station 111, also referred to herein as a source base station, and a second base station 112, also referred to herein as a target base station. The base stations may also each be referred to as a NodeB, an evolved Node B (eNB, eNode B), an Access Point Base Station, a base station router, or any other network unit capable of communicating with a user equipment within a cell served by the base station, depending e.g. on the radio access technology and terminology used.

The wireless communications network 100 further comprises a first service network node 121 associated with the first base station 111, and a second service network node 122 associated with the second base station 112.

The first service network node 121 may be a service network node, or in other words a service network, in or connected to the first base station 111. The second service network node 122 may be a service network node, or in other words a service network, in or connected to the second base station 112. Each of the first service network node 121 and the second service network node 122 may further be a device such as a computer, Central Processing Unit (CPU) or server. The service network nodes 121, 122 may each be implemented as distributed clouds. Such a cloud may be a network of CPUs offering services to users.

The first base station 111 serves a user equipment 130, also referred to as a UE or a wireless device. In other words, the user equipment 130 is located in a cell served by the first base station 111 and communicates with the first base station 111.

The user equipment 130 may e.g. be a mobile terminal or a wireless terminal, a mobile phone, a computer such as e.g. a laptop, a Personal Digital Assistants PDAs or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

Figure 2:
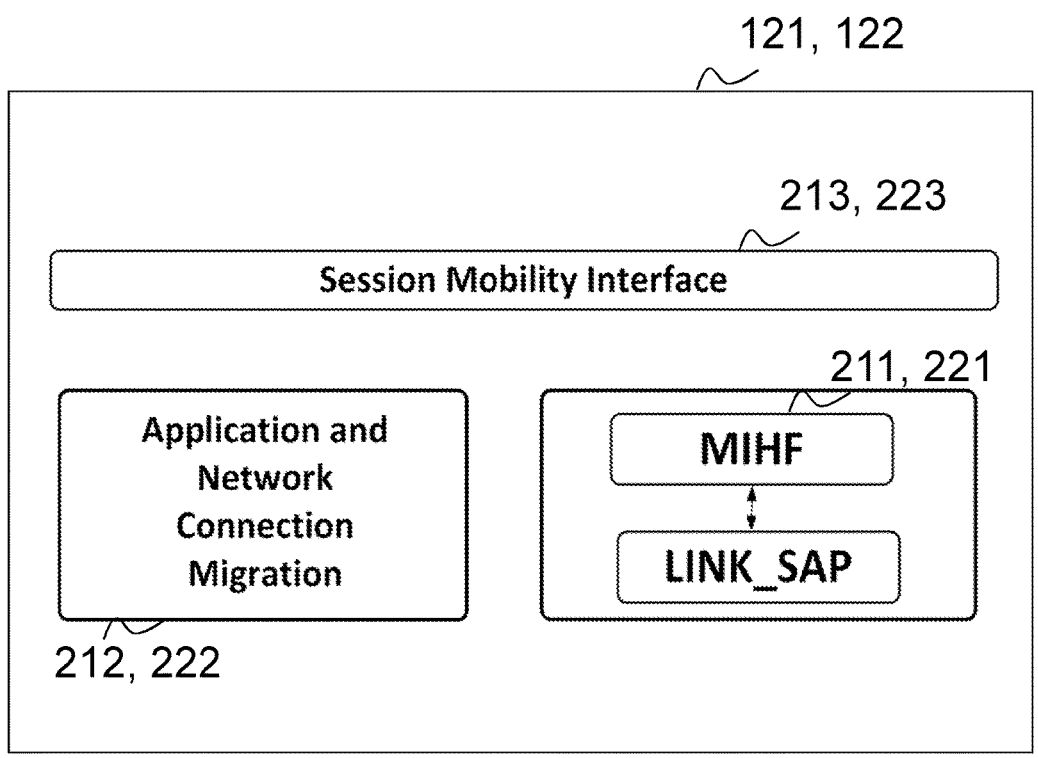
FIG. 2 is a schematic block diagram illustrating embodiments of a service network node.

The first and second service network nodes 121, 122 may each comprise the following modules, presented in FIG. 2, for the migration of a service session: a Media Independent Handover function (MIHF) module 211, 221, an application and network connection Migration System (MS) module 212, 222 and a Session Mobility Interface module 213, 223. The following sections describe the three modules in detail. The interfacing of each module will be described in detail later. The ecosystem also comprises a 3G-LTE/SAE network and service applications whose service sessions need migration as the user equipment, e.g. the user equipment 130, is handed over from one base station to another, e.g. from the first base station 111 to the second base station 112. The first and the second service network nodes 121, 122 may be used to migrate service sessions from one base state to another, e.g. from the first base station 111 to the second base station 112.

Media Independent Handover Function (MIHF) Module 211, 221

MIH is an IEEE 802.21 specification that enables handovers between heterogeneous networks without service disruption. MIH provides a framework for lower layer handover signals and/or indications from the 3G-LTE/SAE network to be relayed to higher layers in a technology agnostic manner. In embodiments herein the MIHF module is configured to provide handover enabling signals, also referred to as triggers, to the higher layers in order to achieve a seamless handover of the application states and the network connection sessions related to the service session.

MS Module 212, 222

The MS module 212, 222 may be responsible for the migration of the service session associated with the user equipment 130 from one base station to another in the event of a user equipment handover in the wireless communications network 100. The MS module 212, 222 is responsible for migration of an application state associated with the services session and a network connection state, each associated with the service session and each being specific for the user equipment 130.

Application states of the service session are snapshots of the current execution sequence of the service that may be paused and then restarted on another instance of the service, e.g. in a corresponding service application in another service network node, such as the second service network node 122.

Network connection migration, i.e. migration of the network connection states, involves transfer of protocol states, e.g. TCP connection states, associated with the connection between the service session and the user equipment 130. Network connection migration also involves the data in transit between the service application and the user equipment 130.

SMI Module 213, 223

The SMI module 213, 223 integrates the MIHF module 211, 221 and the MS module 212, 222 together. The SMI module 213, 223 also provides the service application with a simple and clear interface to migrate the service session associated with the user equipment 130 from one service application instance to another, i.e. from the service application running in the first service network node 121 to a corresponding service application running in the second service network node 122. The SMI module 213, 223 also provides a standard interface over which the information about the application states and network connection states may be transferred. ConteXt Transfer Protocol (CXTP) may be used to exchange the state information between two SMI modules.

Figure 3:
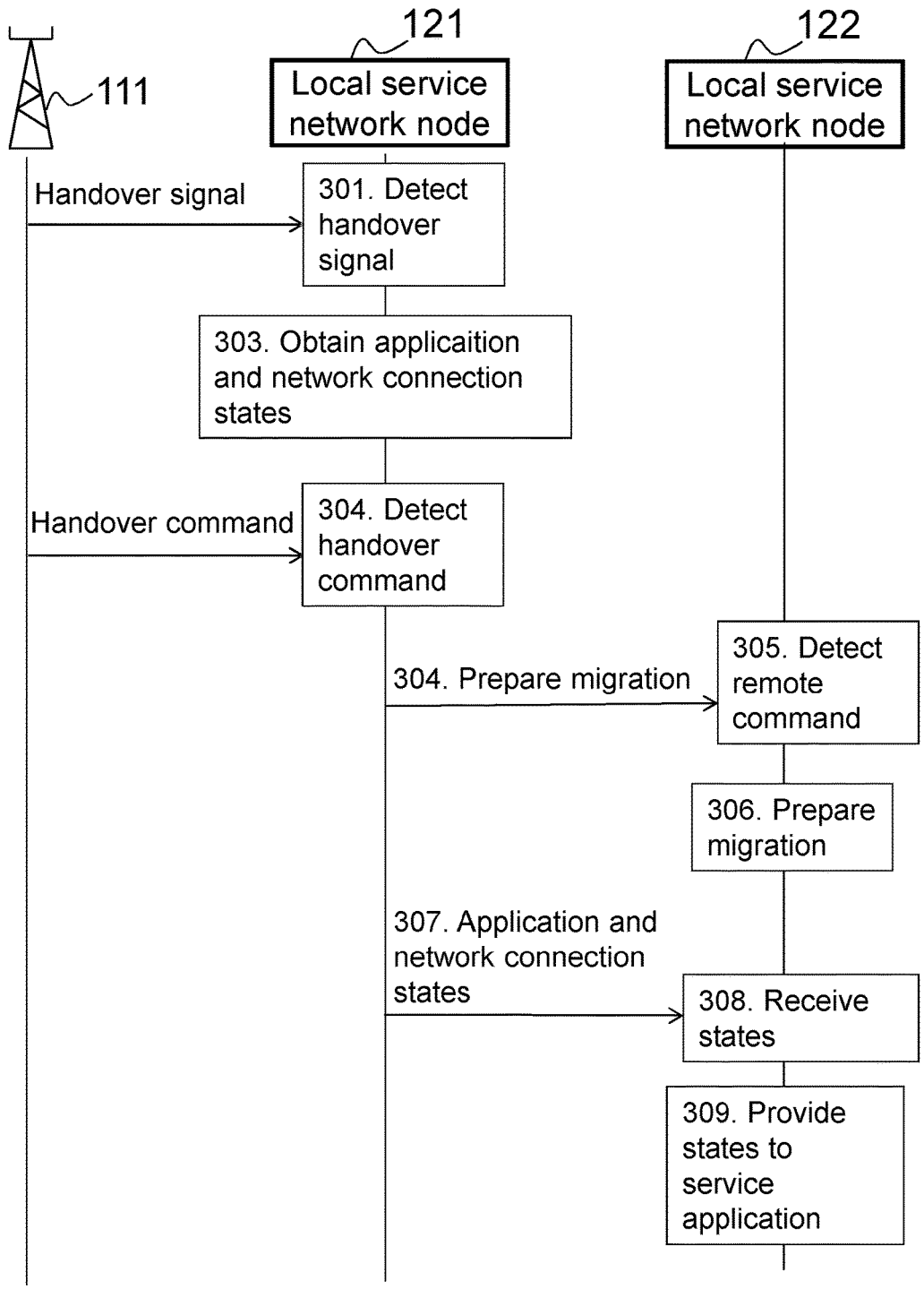
FIG. 3 is a combined block diagram and flowchart illustrating embodiments herein.

Actions for handling a service session associated with the user equipment 130 in the wireless communications network 100, will now be described with reference to a combined flowchart and signalling diagram depicted in FIG. 3.

As mentioned above, the user equipment 130 is served by the first base station 111. A service session is provided to the user equipment 130 by a service application running in the first service network node 121. In this way a service quality may be enhanced due to a reduced latency between the user equipment 130 and the service application.

The user equipment 130 is to be handed over to a cell served by the second base station 112. The handover may for example be due to mobility of the user equipment 130.

Action 301

The first service network node 121 detects a handover signal, e.g. from the first base station 111, or e.g. from a 3G-LTE/SAE compatible device.

The handover signal indicates a request to prepare for handover of the user equipment 130 from the first base station 111 to the second base station 112. In other words, the first base station 111 wants to do handover of the user equipment 130 from a cell served by the first base station 111 to a cell served by the second base station 112.

The detection may be performed by a first MIHF module 211 comprised in the first service network node 121. The first MIHF module 211 may convey the handover signal to a first SMI module 213 comprised in the first service network node 121.

This action relates to action 401 below.

Action 302

The conveyed handover signal from the first MIHF module 211 may trigger the first SMI module 213 to obtain the service session state associated with the service session.

The service session state may be obtained from the service application running in the first service network node 121. The first SMI module 213 may for example obtain the service session state by sending a message to the first instance of the service application indicating that the first instance of the service application should prepare to export the service application state, and obtain the service session state in a response. This may be done by generating an API-event, such as prepare-for-export.

In response to the API-event the service application pauses the service session associated with the user equipment 130 and exports the service session state.

Then the first SMI module 213 may convey the service session state to a first MS module 212 comprised in the first service network node 121. The first MS module 212 may obtain the application state by extracting it from the service session state.

The first MS module 212 may further obtain the network connection state from TCP/IP identifiers or buffers in a TCP/IP stack. The first MS module 212 may then send the application state and the network connection state to the first SMI module 213 which is responsible for communicating the application state and the network connection state to the second service network node 122.

This action relates to action 402 below.

Action 303

The first service network node 121 detects a handover command from the first base station 111 to the second base station 112. The handover command commands handover of the user equipment 130 from the first base station 111 to the second base station 112.

This action may be performed by the first MIHF module 211.

This action relates to action 403 below.

Action 304

The first service network node 121 sends a command to the second service network node 122, commanding the second service network node 122 to prepare for migration of the service session from the first service network node 121.

The command may be a MIH remote command. This action may be triggered by the detection of the handover command and may be performed by the first MIHF module 211.

This action relates to action 404 below.

Action 305

The second service network node 122 detects the command, such as the MIH remote command, from the first service network node 121. The command triggers the second network node to prepare for reception of an application state and a network connection state associated with the service session, over an interface such as an CXTP interface. This action may be performed by a second MIHF module 221 comprised in the second service network node 122. The triggering to prepare for handover of the service session may be performed by the second MIHF module 221 by sending a handover preparation request to a second SMI module 223 comprised in the second service network node 122.

This action relates to action 601 below.

Action 306

The first service network node 121 sends the application state and the network connection state to the second service network node 122. This enables the service session to be resumed in a corresponding service application running in the second service network node 122.

The first service network node 121 sends the application state and the network connection state, e.g. mapped into a Context Data Block used by a CXTP to the second network node 111 via an interface such as an CXTP interface.

This action may be performed by the first SMI module 213. The first SMI module 213 may map the connection state and the application state into the Context Data Block used by the CXTP protocol. The Context Data Block may be identified with a Feature Profile Type, used by the CXTP to identify the way that data is organized. The Feature Profile Type may indicate a type of data included in a data field in the Context Data Block.

This action relates to action 405 below.

Action 307

The second service network node 122 receives the application state and the network connection state from the first network node 121. The application state and network connection state may be mapped onto the Context Data Block used by the CXTP protocol. This action may be performed by the second SMI module 223.

This action relates to action 602 below.

Action 308

The second service network node 122 extracts the application state and the network connection state of the service session, e.g. from the Context Data Block. This action may be performed by a second MS module 222 comprised in the second service network node 122. The Context Data Block may be provided to the second MS module 222 by the second SMI 223.

Action 309

The second service network node 122 provides a corresponding service application, i.e. a second instance of the service application, running in the second network node 111 with the application state and the network connection state of the service session, whereby the service session may be resumed in the second instance of the service application.

This action may be performed by the second SMI module 223. For example, the second SMI module 223 may be triggered by the reception of the application state and the network connection state in action 307 to request the second instance of the service application to prepare to import the application state and the network connection states.

The second SMI module 223 may provide the extracted application state and network connection state to the second instance of the service application after receiving a message from the second instance of the service application indicating a request to provide the application state and the connection state.

This action relates to action 603 below.

A method will now be described from a perspective of the first service network node 121. Thus, embodiments of a method in the first service network node 121 for handling a service session associated with the user equipment 130 in the wireless communications network 100, will now be described with reference to a flowchart depicted in FIG. 3.

As mentioned above, the user equipment 130 is served by the first base station 111. The service session is provided to the user equipment 130 by the service application running in the first service network node 121. The first service network node 121 may be a local service network node in or connected to the first base station 111, and the second service network node 122 may be a local service network node in or connected to the second base station 112.

The first base station 111 wants to do handover of the user equipment 130 to a cell served by the second base station 112, for example in order to support mobility.

The method comprises the following actions, which actions may be taken in any suitable order.

Action 401

The first service network node 121 detects the handover signal from the first base station 111 to the second base station 112. The handover signal indicates a request to the second base station 112 to prepare for handover of the user equipment 130 from the first base station 111 to the second base station 112. In other words, to prepare for handover of the user equipment 130 from a cell served by the first base station 111 to a cell served by the second base station 112.

Since the first service network node 121 detects the handover signal from the first base station 111 the first service network node 121 is able to provide make before break migration of the service session to the second service network node 122. In other words, the first service network node 121 detects that the first base station 111 wants to do handover of the user equipment 130 the first service network node 121 before the handover command is sent to the second base station 112. In that way the first service network node 121 is able to provide the second service network node 122 with the application state and the network connection state at the time the handover command is sent to the second base station 112 and the service session is resumed in the second service network node 122 without any disruption after the handover has been completed.

Embodiments herein enable seamless migration of the network connection state and the application state from the service application running in the first service network node 121 to the corresponding service application in the second service network node 122, without any intervention from, or disruption on the user equipment 130.

This action relates to action 301 above.

Action 402

The first service network node 121 obtains an application state and a network connection state, each associated with the service session and each being specific for the user equipment 130.

The application state may be obtained from a service session state associated with the service session.

In some embodiments the service session state is obtained from the service application running in the first service network node 121.

The service session state may be obtained by indicating to the service application running in the first service network node 121 that the service application should prepare to export the service application state, and obtaining the service session state in response. In other words, in order to obtain the service session state the first service network node 121 may indicate to the service application running in the first service network node 121 that the service application should prepare to export the service application state, and obtain the service session state in response.

This action relates to action 302 above.

Action 403

The first service network node 121 detects a handover command to the second base station 112. The handover command commands handover of the user equipment 130 from the first base station 111 to the second base station 112.

This action relates to action 303 above.

Action 404

When the first service network node 121 has detected the handover command in action 303 above, the first service network node 121 sends a command to the second service network node 122, commanding the second service network node 122 to prepare for migration of the service session from the first service network node 121.

In some embodiments the command sent to the second service network node 122 is the MIH remote command.

This action relates to action 304 above.

Action 405

When the first service network node 121 has send the command to prepare for migration of the service session to the second service network node 122, the first service network node 121 sends the application state and the network connection state to the second service network node 122. This enables the service session to be resumed in a corresponding service application running in the second service network node 122.

In order for the first service network node 121 to send the application state and the network connection state to the second service network node 122 the first service network node 121 may map the application state and the network connection state into a Context Data Block used by the CXTP and send the Context Data Block to the second service network node 122 via the CXTP interface.

This action relates to action 307 above.

Figure 4:
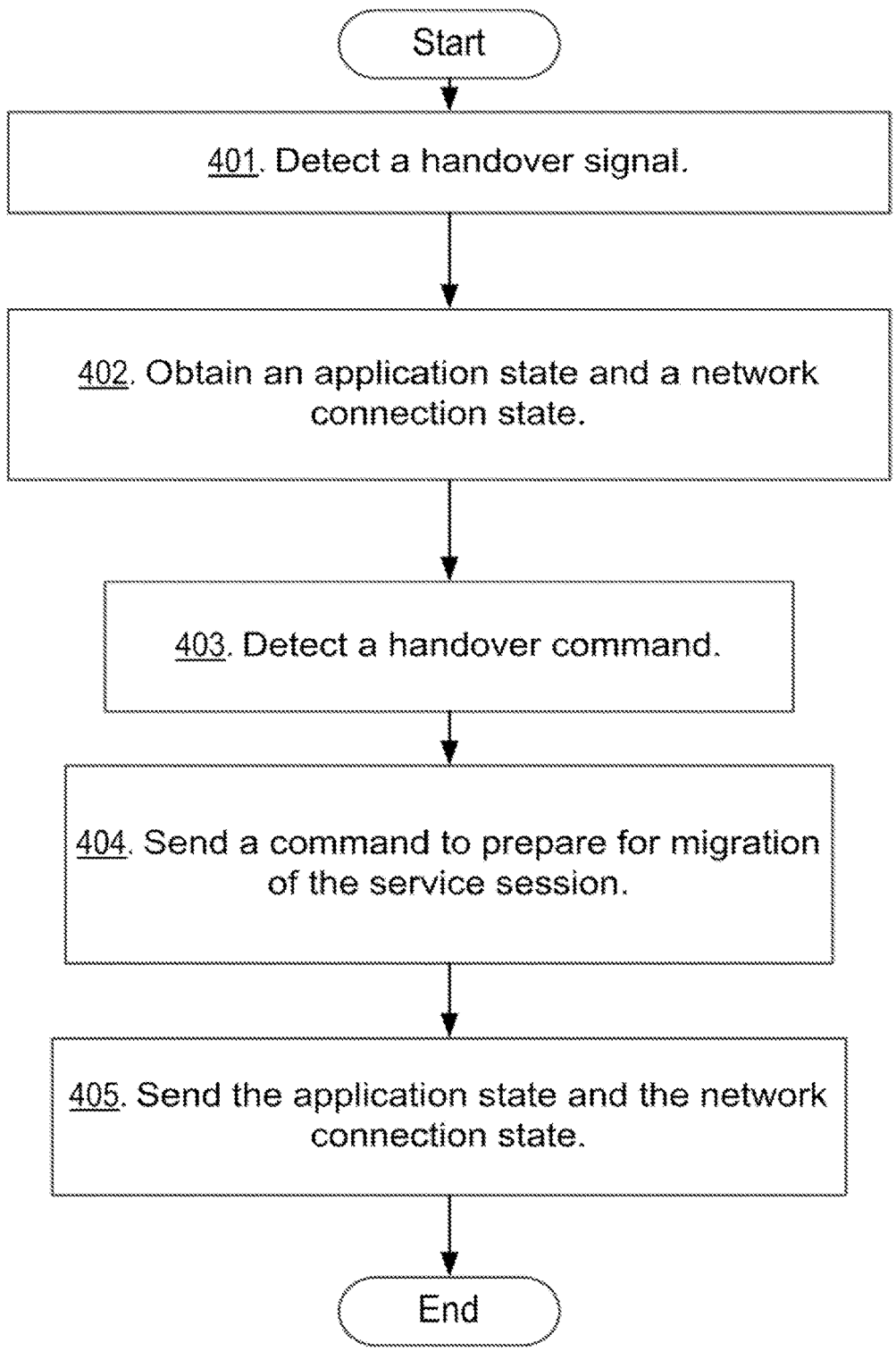
FIG. 4 is a flowchart depicting embodiments of a method in a first service network node.
Figure 5:
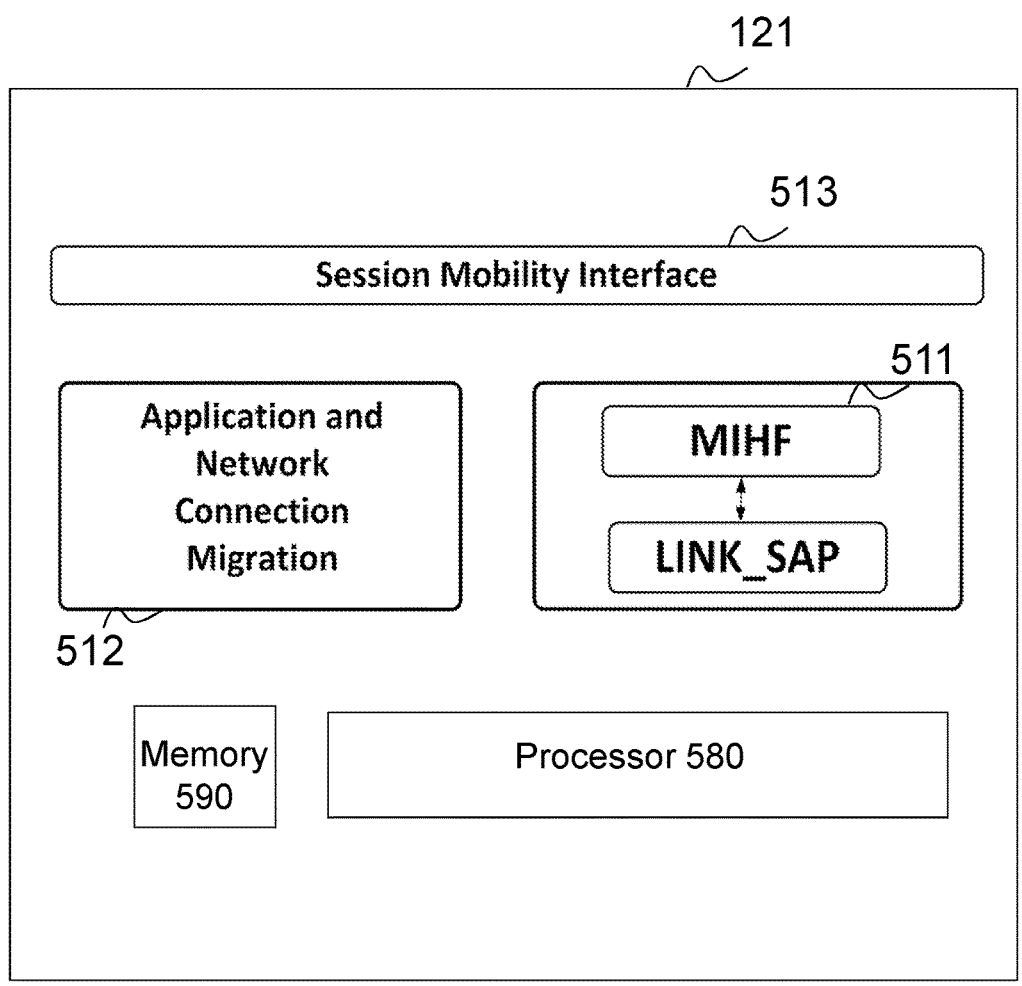
FIG. 5 is a schematic block diagram illustrating embodiments of a first service network node.

To perform the method actions of for handling a service session associated with the user equipment 130 in the wireless communications network 100 described above in relation to FIG. 4, the first service network node 121 may comprise the following arrangement depicted in FIG. 5.

As mentioned above, the user equipment 130 is configured to be served and/or to communicate with the first base station 111. The first service network node 121 comprises the service application configured to provide the service session to the user equipment 130.

The first service network node 121 may be configured to be a local service network node in or connected to the first base station 111, and the second service network node 122 may be configured to be a local service network node in or connected to the second base station 112.

The first base station 111 may want to do handover of the user equipment 130 to a cell served by the second base station 112, for example in order to support mobility. The first service network node 122 is configured to handle the service session by migrating the application state and the network connection state associated to the service session to the second service network node 122.

The first service network node 121 is configured to, e.g. by means of the MIHF module 211, 511 configured to, detect a handover signal, which handover signal indicates a request to prepare for handover of the user equipment 130 from the first base station 111 to a second base station 112.

The MIHF module 211, 511 may be comprised in a processor 580 in the first network node 121.

The first service network node 121 is further configured to, e.g. by means of the MS module 212, 512 and/or the SMI module 213, 513 configured to, obtain an application state and a network connection state, each associated with the service session and each being specific for the user equipment 130.

The first service network node 121 may be configured to, e.g. by means of the SMI module 213, 513 configured to, obtain the application state from a service session state associated with the service session.

In some embodiments the first service network node 121 is configured to, e.g. by means of the SMI module 213, 513 configured to, obtain the service session state from the service application running in the first service network node 121.

The first service network node 121 may be configured to, e.g. by means of the SMI module 213, 513 configured to, indicate to the service application running in the first service network node 121 that the service application should prepare to export the service application state, and obtain the service session state in response.

The MS module 212, 512 and the SMI module 213, 513 may be comprised in the processor 580 in the first service network node 121.

The first service network node 121 is further configured to, e.g. by means of the MIHF module 511 configured to, detect the handover command, which handover command commands handover of the user equipment 130 from the first base station 111 to the second base station 112.

The first service network node 121 is further configured to, e.g. by means of the MIHF module 511 configured to, send a command to a second service network node 122, commanding the second service network node 122 to prepare for migration of the service session from the first service network node 121.

In some embodiments the first service network node 121 is configured to, e.g. by means of the MIHF module 511 configured to, send the command to the second service network node 122 as the MIH remote command.

The first service network node 121 is further configured to, e.g. by means of the SMI module 213, 513 configured to, send the application state and the network connection state to the second service network node 122, enabling the service session to be resumed in a corresponding service application running in the second service network node 122.

In some embodiments the first service network node 121 is further configured to, e.g. by means of the SMI module 213, 513 configured to, map the application state and the network connection state into a Context Data Block used by a ConteXt Transfer Protocol, CXTP, and send the Context Data Block to the second service network node 122 via an CXTP interface.

The embodiments herein for handling the service session associated with the user equipment 130 in the wireless communications network 100, may be implemented through one or more processors, such as the processor 580 in the first service network node 121 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the first service network node 121. One such carrier may be in the form of a CD ROM disc. It is however feasible with other data carriers such as a memory stick. The computer program code may furthermore be provided as pure program code on a server and downloaded to the first service network node 121.

The first service network node 121 may further comprise a memory 590 comprising one or more memory units. The memory 590 is configured to store e.g. the handover signal, application states, network connection states, configurations, and computer program code to perform the methods herein when being executed in the first service network node 121.

Those skilled in the art will also appreciate that the MIHF module 211, 511, the MS module 212, 512 and the SMI module 213, 513 described above may refer to a combination of analogue and digital circuits, and/or one or more processors configured with software and/or firmware, e.g. stored in a memory, that when executed by the one or more processors such as the processor 580 perform as described above. One or more of these processors, as well as the other digital hardware, may be included in a single Application-Specific Integrated Circuit ASIC), or several processors and various digital hardware may be distributed among several separate components, whether individually packaged or assembled into a System-on-a-Chip (SoC).

Figure 6:
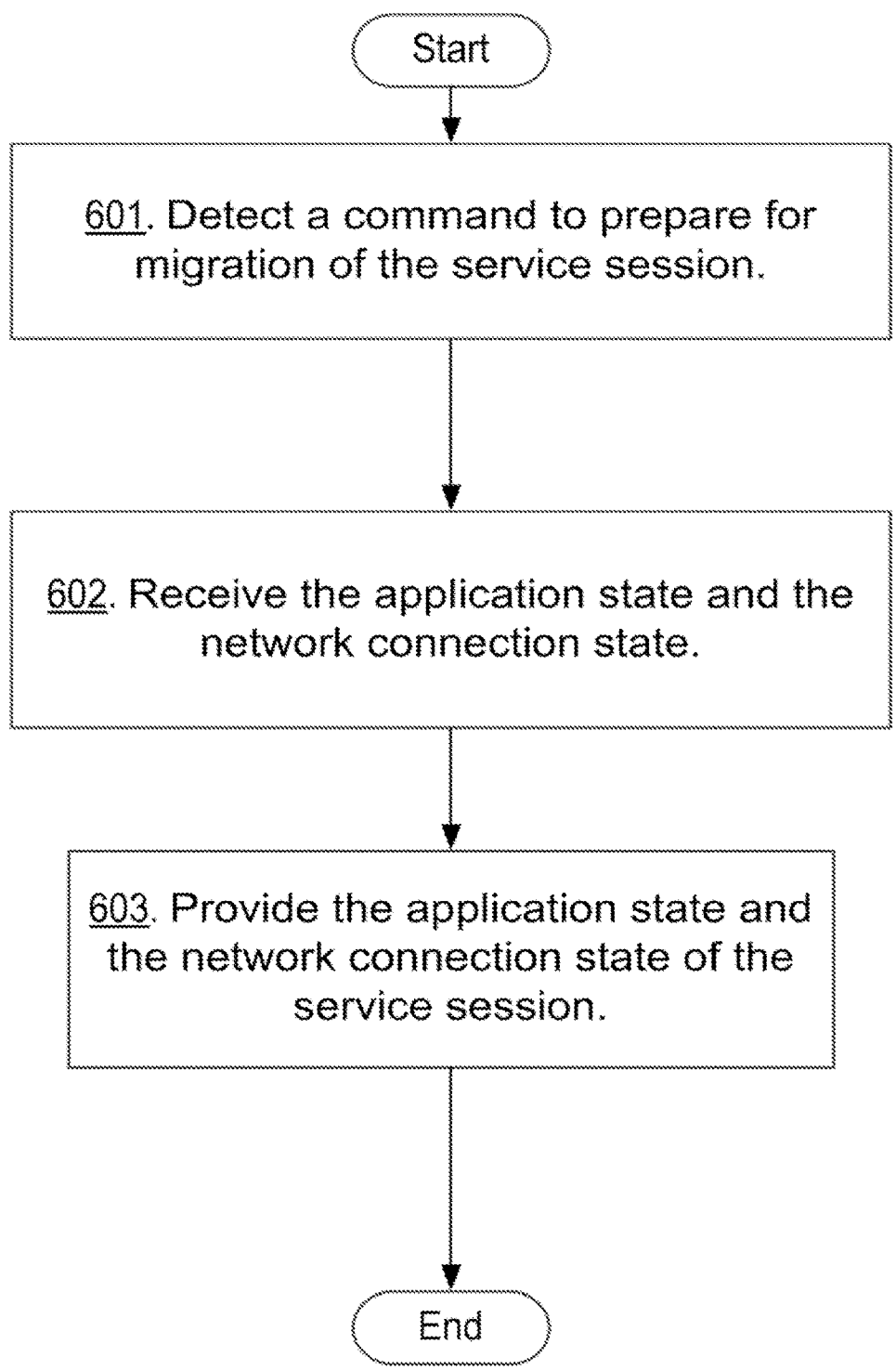
FIG. 6 is a flowchart depicting embodiments of a method in a second service network node.

A method will now be described from a perspective of the second service network node 122. Thus, embodiments of a method in the second service network node 122 for handling a service session associated with the user equipment 130 in the wireless communications network 100, will be described with reference to a flowchart depicted in FIG. 6.

As mentioned above, the user equipment 130 is served by the first base station 111. In other words, the user equipment communicates with the first base station 111. The service session is provided to the user equipment 130 by the service application running in the first service network node 121.

The first service network node 121 may be a local service network node in or connected to the first base station 111. The first base station 111 wants to do handover of the user equipment 130 to a cell served by the second base station 112, for example in order to support mobility and sends a handover command to the second base station 112.

In order to continue to provide the service session from a local service application the first service network node 121 wants to migrate the service session to the second service network node 122, which may be a local service network node in or connected to the second base station 112. The first service network node 121 has detected the handover command from the first base station 111 and has send a command to the second service network node 122 commanding the second service network node 122 to prepare for migration of the service session from the first service network node 121.

The method comprises the following actions, which actions may be taken in any suitable order.

Action 601

The second service network node 122 detects the command from the first service network node 121, which command commands the second service network node 122 to prepare for migration of the service session from the first service network node 121.

In response to the command from the first service network node 121 the second service network node 122 prepares for migration of the service session from the first service network node 121.

The detected command may further command the second service network node 122 to prepare for reception of the application state and the network connection state. The application state and the network connection state is each associated with the service session, and is each specific for the user equipment 130. In this case the second service network node 122 prepares for reception of the application state and the network connection state.

In some embodiments the detected command further commands the second service network node 122 to prepare for reception of the application state and the network connection state over the CXTP interface. In this case the second service network node 122 prepares for reception of the application state and the network connection state over the CXTP interface.

The detected command from the first service network node 121 may be the MIH remote command.

This action relates to actions 305 above.

Action 602

The second service network node 122 receives the application state and the network connection state from the first service network node 121. The application state and the network connection state is each associated with the service session, and is each specific for the user equipment 130.

This action relates to action 307 above.

Action 603

The second service network node 122 provides a corresponding service application running in the second service network node 122, i.e. a second instance of the service application, with the application state and the network connection state of the service session. This enables the service session to be resumed in the corresponding service application running in the second service network node 122 without disruption of the service session and without any intervention of the user equipment 130.

The second service network node 122 may receive the Context Data Block used by the CXTP from the first service network node 121 via the CXTP interface, and extract the application state and the network connection state from the Context Data Block.

This action relates to action 309 above.

Figure 7:
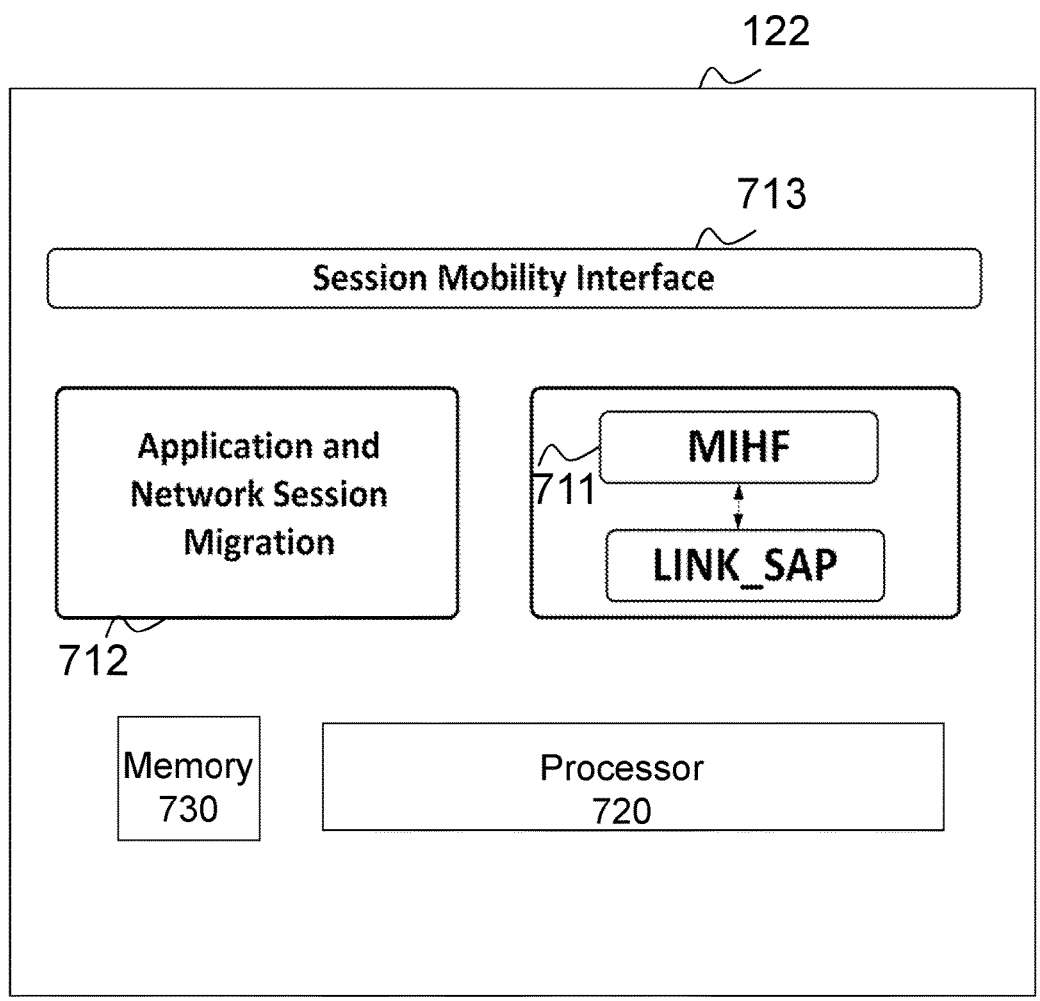
FIG. 7 is a schematic block diagram illustrating embodiments of a second service network node.

To perform the method actions for handling a service session associated with the user equipment 130 in the wireless communications network 100, described above in relation to FIG. 6, the second service network node 122 may comprises the following arrangement depicted in FIG. 7. The second service network node 122 is configured to handle the service session by being configured to migrate the application state and the network connection state associated to the service session.

The user equipment 130 is configured to be served and/or to communicate with the first base station 111. The user equipment 130 is further configured to be handed over to the second base station 112 associated with the second service network node 112.

The first service network node 121 comprises the service application configured to provide the service session to the user equipment 130.

The first service network node 121 may be configured to be a local service network node in or connected to the first base station 111, and the second service network node 122 may be configured to be a local service network node in or connected to the second base station 112.

The second service network node 122 is configured to, e.g. by means of the MIHF module 221, 711 configured to, detect a command, from the first service network node 121, which command commands the second service network node 122 to prepare for migration of the service session from the first service network node 121.

The second service network node 122 may be configured to prepare for reception of the application state and the network connection state upon detecting the command.

In some embodiments the second service network node 122 is configured to prepare for reception of the application state and the network connection state over a CXTP interface upon detecting the command.

The second service network node 122 may be configured to detect a MIH remote command from the first service network node 121.

The MIHF module 221, 711 may be comprised in a processor 780 in the second network node 122.

The second service network node 122 is configured to, e.g. by means of the SMI module 213, 713 configured to, receive an application state and a network connection state from the first service network node 121. The application state and the network connection state is each associated with the service session, and is each specific for the user equipment 130.

The second service network node 122 may be configured to receive a Context Data Block used by a CXTP from the first service network node 121 via the CXTP interface, and to extract the application state and the network connection state from the Context Data Block.

The SMI module 213, 713 may be comprised in the processor 780 in the second network node 122.

The second service network node 122 is configured to, e.g. by means of the MS module 222, 512 and/or the SMI module 213, 713 configured to, provide a corresponding service application running in the second service network node 122 with the application state and the network connection state of the service session, enabling the service session to be resumed in the corresponding service application running in the second service network node 122.

The MS module 222, 712 and the SMI module 223, 713 may be comprised in the processor 780 in the second service network node 122.

The embodiments herein for handling a service session associated with the user equipment 130 in the wireless communications network 100 may be implemented through one or more processors, such as the processor 780 in the second service network node 122 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the second service network node 122. One such carrier may be in the form of a CD ROM disc. It is however feasible with other data carriers such as a memory stick. The computer program code may furthermore be provided as pure program code on a server and downloaded to the second service network node 122.

The second service network node 122 may further comprise a memory 790 comprising one or more memory units. The memory 790 is arranged to be used to store for example application states, network connection states, configurations, and computer program code to perform the methods herein when being executed in the second service network node 122.

Those skilled in the art will also appreciate that the MIHF module 211, 221, 511, 711 the MS module 212, 222, 512, 712 and the SMI module 213, 223, 513, 713 described above may refer to a combination of analogue and digital circuits, and/or one or more processors configured with software and/or firmware, e.g. stored in a memory, that when executed by the one or more processors such as the processor 780 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Interfaces

Figure 8:
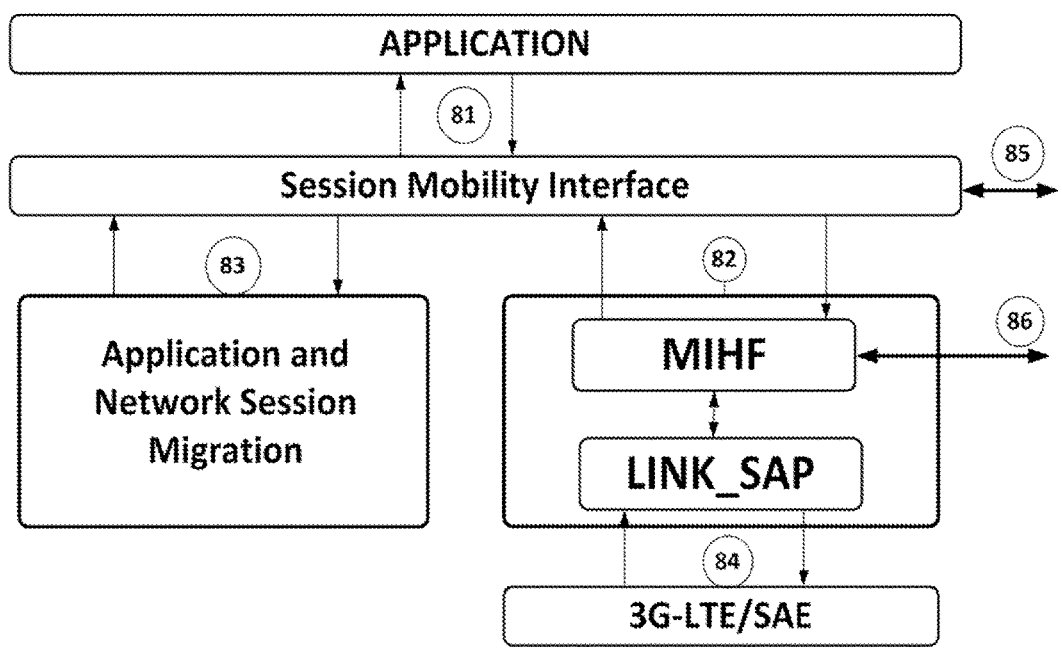
FIG. 8 is a schematic block diagram illustrating further embodiments herein.

The interfaces between the different modules comprised in the service network nodes, and the interfaces between the modules comprised in the service network nodes and other entities interacting with the service network nodes will now be described. These interfaces are depicted in FIG. 8.

Interface 81

This interface is used by the SMI module 213, 513, 713 to inform the service application to prepare for migration of its session states. The service application uses this interface to export and import the session states to and from the SMI module 313, 513, 713. Primitives, also referred to as APIs, of this interface are given below:

PREPARE_TO_EXPORT (ue_identifier).
EXPORT(ue_identifier, session_data)
PREPARE_TO_IMPORT (ue_identifier)
IMPORT(ue_identifier, session_data)

Interface 82

This is a standard interface between the MIHF module 311, 511, 711 and its user, in this case the SMI module 313, 513, 713. The interface is defined by the IEEE 802.21 specification. Primitives of this interface are the MIH commands and events as defined in the IEEE 802.21 specification.

Interface 83

This interface is used by the SMI module 313, 513 to request the first MS module 312, 512 to extract the service session information that is UE specific and the network connection states associated with the service session in case of an export operation. In case of an import operation the second SMI module 513 requests the second ANCMS 512 to induct a new UE specific session into the service application and to import, or extract, the network connections associated with the session from the CXTP message. Primitives of this interface are given below:

a. SESSION_EXPORT(ue_identifier, session_data)
b. SESSION_IMPORT(ue_identifier, session_data)
c. SESSION_EXPORTED (ue_identifier, session_data)
d. SESSION_IMPORTED (ue_identifier, session_data)

Interface 84

This is a standard interface between the MIHF module and the 3G-LTE/SAE subsystems. This interface is a technology agnostic abstraction as defined by the IEEE 802.21 specification. This interface is used to relay link layer events related to handover from the 3G-LTE/SAE subsystems to the first MIHF module 311. The primitives of this interface are link events and link commands defined by the IEEE 802.21 specification.

Interface 85

This interface is used by the first SMI module 213, 513 to transfer the application and protocol state information to its peer, i.e. the second SMI module 223, 713. This interface uses the CXTP protocol to transfer the session state related information.

Interface 86

This is a standard interface between local and remote MIHF modules, such as the first MIHF module 311 and the second MIHF module 511. This interface is used by the MIHF modules to coordinate and achieve a handover. The primitives for this interface are the remote MIH commands and events as defined by the IEEE 802.21 specification.

Figure 9:
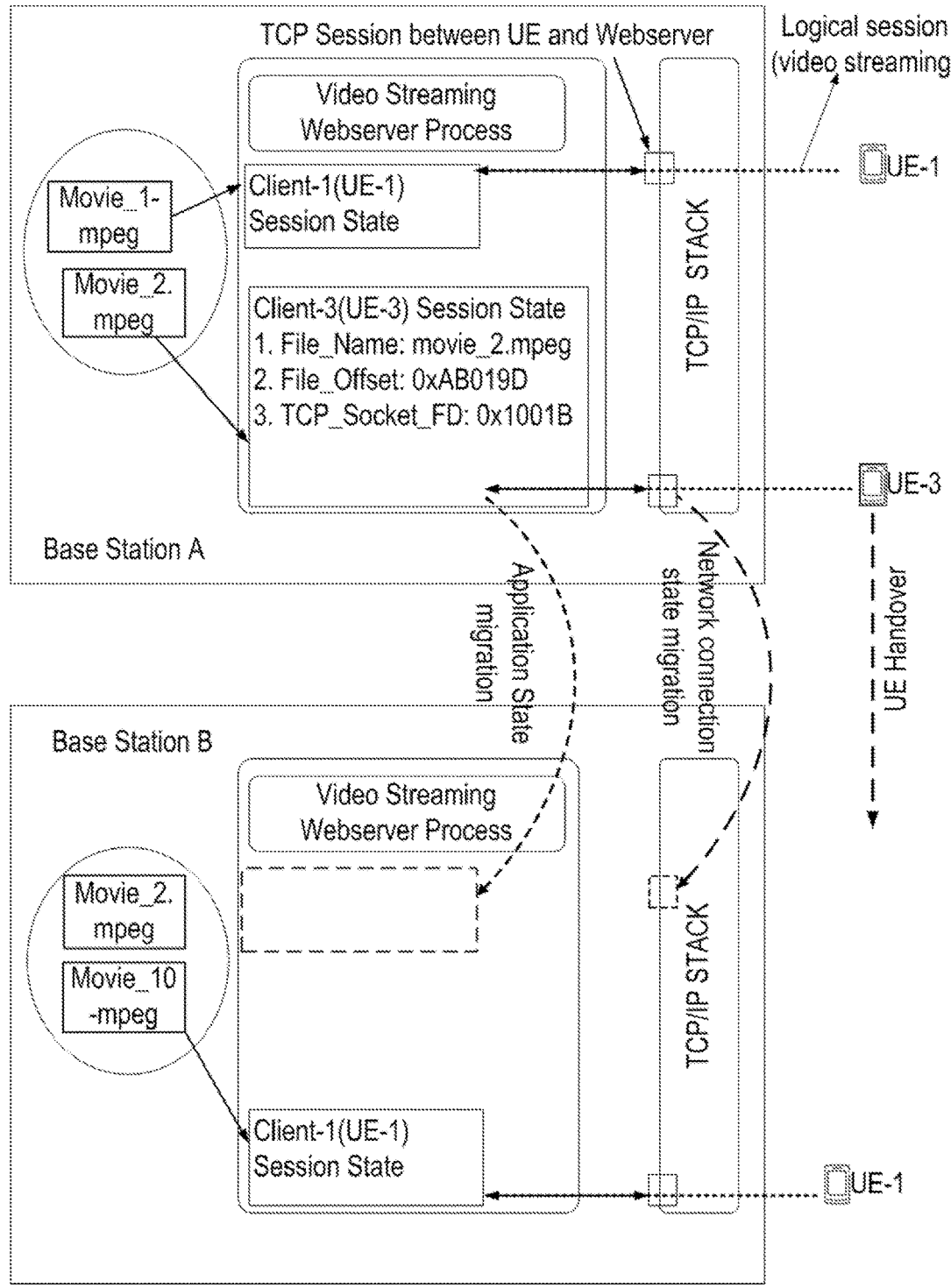
FIG. 9 is a schematic block diagram illustrating further embodiments herein.

FIG. 9 illustrates the concept of application state and protocol state migration according to some embodiments herein. FIG. 9 shows an example for a video streaming webserver. In the example, the service is a video streaming webserver. The client UE-3 such as the user equipment 130 is connected to the video streaming webserver, such as the first service network node 121, on the Base Station A such as the first base station 111. The video streaming webserver maintains the application states related to the client UE-3. These states in the example service are: a file name of the video being watched by the client, e.g. movie_2.mpeg, a file offset, e.g. 0xAB019D, which is a current position of the video, and a TCP socket File Descriptor (FD) for the connection, e.g. 0x1001B. The TCP/IP stack maintains the network connection states related to the client UE-3. When the client UE-3 is handed over from Base Station A to Base Station B, such as the second base station 112. Both the application states and the network connection states are migrated from Base Station A to Base Station B, or in other words from the first service network node 121 located in Base Station A to the second service network node 122 located in Base Station B. The video webserver application on the Base Station B imports the application states received from the Base Station A. Base Station B imports the network connection states related to the client UE-3 that was received from Base Station A. Once both the application states and the network connection states are imported on the Base Station B, the video streaming may resume from the video streaming webserver on the Base Station B towards the client UE-3.

For other applications, the application state may comprise different application state information, for example:

Bandwidth Broker: A function that admits or denies access to transport bandwidth. A session application state for such an entity may comprise "Admitted bandwidth" and "ClassOfService" parameters. The "ClassOfService" parameters may refer to a Differentiated Services Code Point (DSCP) value, as disclosed in Internet Engineering Task Force (IETF) Request For Comments (RFC) 2475, RFC 2474, RFC 3246, RFC 2597. The "ClassOfService" parameters may also refer to Expedited Forwarding (EF)/Assured Forwarding (AF) classes. These are defined by the IETF as a part of Differentiated services architecture.

Session Initiation Protocol (SIP) session, as disclosed in IETF RFC 3261. SIP is the base protocol for IP Multimedia Subsystem (IMS). A SIP session state, in the context of IMS, may include many different parameters, e.g. telephone-numbers E-164 and IP-addresses of the A part, i.e. the initiator, and B-part, i.e. the acceptor of the call. The state description is very simplistic compared to a real-implementation.

There are of course several other application states that may be designed for different applications. These are just examples.

Note that terminology such as a first service network node and a second service network node should be considered to be non-limiting and does in particular not imply a certain hierarchical relation between the two.

When using the word "comprise" or "comprising" it shall be interpreted as non-limiting, i.e. meaning "consist at least of".

The embodiments herein are not limited to the above described preferred embodiments. Various alternatives, modifications and equivalents may be used. In other words, although terminology from 3GPP LTE/SAE has been used to exemplify embodiments herein, this should not be seen as limiting the scope of the embodiments herein to only the aforementioned system. Other wireless systems using Layer-3 and above connection handover mechanisms, including UMTS, GSM, any 3GPP cellular network and other, may also benefit from exploiting the ideas underlying the embodiments.

Therefore, the above embodiments should not be taken as limiting the scope, which is defined by the appending claims.

The invention claimed is:

1. A method in a first service network node for handling migration, without disrupting a service session associated with a user equipment in a wireless communications network, which user equipment is served by a first base station, and which service session is provided to the user equipment by a service application running in the first service network node associated with the first base station, the method comprising:

detecting a handover signal, which handover signal indicates a request to prepare for handover of the user equipment from the first base station to a second base station;

obtaining an application state and a network connection state, each associated with the service session and each being specific for the user equipment, wherein the application state is a snapshot of a current execution sequence of a service that is to be paused and then resumed in a corresponding service application in a second service network node associated with the second base station, and wherein the network connection state comprises a protocol state, which is associated with the network connection between the service and the user equipment;

detecting a handover command, which handover command commands handover of the user equipment from the first base station to the second base station;

sending a command to the second service network node, associated with the second base station, commanding the second service network node to prepare for migration of the service session from the first service network node; and sending the application state and the network connection state to the second service network node, enabling the service session to be resumed in the corresponding service application running in the second service network node.

2. The method according to claim 1, wherein the sending of the application state and the network connection state to the second service network node comprises:

mapping the application state and the network connection state into a Context Data Block used by a ConteXt Transfer Protocol, CXTP, and sending the Context Data Block to the second service network node via an CXTP interface.

3. The method according to claim 1, wherein the application state is obtained from a service session state associated with the service session.

4. The method according to claim 3, wherein the service session state is obtained from the service application running in the first service network node.

5. The method according to claim 4, wherein the service session state is obtained by:

indicating to the service application running in the first service network node that the service application should prepare to export the service application state, and obtaining the service session state in response.

6. The method according to claim 1, wherein the command sent to the second service network node is a Media Independent Handover, MIH, remote command.

7. The method according to claim 1, wherein the first service network node is a local service network node in or connected to the first base station, and the second service network node is a local service network node in or connected to the second base station.

8. A first service network node configured for handling migration, without disrupting a service session associated with a user equipment in a wireless communications network, which user equipment is configured to be served by a first base station, and wherein the first service network node, which is associated with the first base station, comprises a service application configured to provide the service session to the user equipment, the first service network node is configured to:

detect a handover signal, which handover signal indicates a request to prepare for handover of the user equipment from the first base station to a second base station;

obtain an application state and a network connection state, each associated with the service session and each being specific for the user equipment, wherein the application state is a snapshot of a current execution sequence of a service that is to be paused and then resumed in a corresponding service application in a second service network node associated with the second base station, and wherein the network connection state comprises a protocol state, which is associated with the network connection between the service and the user equipment;

detect a handover command, which handover command commands handover of the user equipment from the first base station to the second base station;

send a command to the second service network node commanding the second service network node to prepare for migration of the service session from the first service network node; and send the application state and the network connection state to the second service network node, enabling the service session to be resumed in the corresponding service application running in the second service network node.

9. The first service network node according to claim 8, wherein the first service network node is further configured to:

map the application state and the network connection state into a Context Data Block used by a ConteXt Transfer Protocol, CXTP; and send the Context Data Block to the second service network node via an CXTP interface.

10. The first service network node according to claim 8, wherein the first service network node is configured to obtain the application state from a service session state associated with the service session.

11. The first service network node according to claim 10, the first service network node is configured to obtain the service session state from the service application comprised in the first service network node.

12. The first service network node according to claim 11, wherein the first service network node is further configured to:

indicate to the service application running in the first service network node that the service application should prepare to export the service application state; and obtain the service session state in response.

13. The first service network node according to claim 8, wherein the first service network node is configured to send the command to the second service network node as a Media Independent Handover, MIH, remote command.

14. The first service network node according to claim 8, wherein the first service network node is configured to be a local service network node in or connected to the first base station, and the second service network node is configured to be a local service network node in or connected to the second base station.

15. A method in a target service network node for handling migration, without disrupting a service session associated with a user equipment in a wireless communications network, which user equipment is served by a first base station and is to be handed over to a second base station, which is associated with the target service network node, and which service session is provided to the user equipment by a service application running in a source service network node associated with the first base station, the method comprising:

detecting a command, from the source service network node, which command commands the target service network node to prepare for migration of the service session from the source service network node;

receiving an application state and a network connection state from the source service network node, which application state and network connection state each is associated with the service session, and each is specific for the user equipment, wherein the application state is a snapshot of a current execution sequence of a service that is to be paused and then resumed in a corresponding service application in the target service network node, and wherein the network connection state comprises a protocol state, which is associated with the network connection between the service and the user equipment; and providing the corresponding service application running in the target service network node with the application state and the network connection state of the service session, enabling the service session to be resumed in the corresponding service application running in the target service network node.

16. The method according to claim 15, wherein the detected command further commands the target service network node to prepare for reception of the application state and the network connection state.

17. The method according to claim 16, wherein the detected command further commands the target service network node to prepare for reception of the application state and the network connection state over a ConteXt Transfer Protocol, CXTP, interface.

18. The method according to claim 15, wherein the receiving of the application state and the network connection state from the source service network node further comprises:
   receiving a Context Data Block used by a ConteXt Transfer Protocol, CXTP, from the source service network node via a CXTP interface, and
   extracting the application state and the network connection state from the Context Data Block.

19. The method according to claim 15, wherein the detected command from the source service network node is a Media Independent Handover, MIH, remote command.

20. The method according to claim 15, wherein the source service network node is a local service network node in or connected to the first base station, and the target service network node is a local service network node in or connected to the second base station.

21. A target service network node configured for handling migration, without disrupting a service session associated with a user equipment in a wireless communications network, which user equipment is configured to be served by a first base station and further configured to be handed over to a second base station associated with the target service network node, and wherein a source service network node, which is associated with the first base station, comprises a service application configured to provide the service session to the user equipment, the target service network node is configured to:

detect a command, from the source service network node, which command commands the target service network node to prepare for migration of the service session from the source service network node;

receive an application state and a network connection state from the source service network node, which application state and network connection state each is associated with the service session, and each is specific for the user equipment, wherein the application state is a snapshot of a current execution sequence of a service that is paused and to be resumed in a corresponding service application in the target service network node, and wherein the network connection state comprises a protocol state, which is associated with the network connection between the service and the user equipment; and provide the corresponding service application running in the target service network node with the application state and the network connection state of the service session, enabling the service session to be resumed in the corresponding service application running in the target service network node.

22. The target service network node according to claim 21, wherein the target service network node is configured to prepare for reception of the application state and the network connection state upon detecting the command.

23. The target service network node according to claim 22, wherein the target service network node is configured to prepare for reception of the application state and the network connection state over a ConteXt Transfer Protocol, CXTP, interface upon detecting the command.

24. The target service network node according to claim 21, wherein the target service network node is configured to:
   receive a Context Data Block used by a ConteXt Transfer Protocol, CXTP, from the source service network node via a CXTP interface; and
   extract the application state and the network connection state from the Context Data Block.

25. The target service network node according to claim 21, wherein the target service network node is configured to detect a Media Independent Handover, MIH, remote command from the source service network node.

26. The target service network node according to claim 21, wherein the source service network node is configured to be a local service network node in or connected to the first base station, and the target service network node is configured to be a local service network node in or connected to the second base station.

* * * * *